US008275523B2

(12) United States Patent
Krimbacher

(10) Patent No.: US 8,275,523 B2
(45) Date of Patent: Sep. 25, 2012

(54) COMMERCIAL VEHICLE WITH CONTROL MEANS AND METHOD FOR CONTROLLING COMMERCIAL VEHICLE

(75) Inventor: Norbert Krimbacher, Satteins (AT)

(73) Assignee: Liebherr-Werk Nenzing GmbH, Nenzing (AT)

( * ) Notice: Subject to any disclaimer, the term of this patent is extended or adjusted under 35 U.S.C. 154(b) by 778 days.

(21) Appl. No.: 12/334,187

(22) Filed: Dec. 12, 2008

(65) Prior Publication Data

US 2009/0157266 A1 Jun. 18, 2009

(30) Foreign Application Priority Data

Dec. 12, 2007 (DE) ......................... 10 2007 059 727

(51) Int. Cl.
*B60K 28/00* (2006.01)

(52) U.S. Cl. .............. 701/50; 701/1; 187/224; 180/167; 180/170; 303/155; 303/121; 303/1; 303/DIG. 2; 303/DIG. 3; 303/DIG. 4; 123/350; 123/319

(58) Field of Classification Search .................... 701/50, 701/23-26, 28, 1; 364/167.02, 528.37, 424.083, 364/424.094, 426.029, 426.033, 426.036, 364/426.043; 180/211, 411, 168, 169, 266, 180/291, 178, 179, 171, 197, 170, 306, 167; 187/224, 222, 226, 234, 237, 231; 414/633, 414/273, 274, 632, 671, 635, 347, 417; 303/155, 303/113.1, 121, 1, DIG. 2, DIG. 3, DIG. 4; 123/349, 350, 319; 477/170
See application file for complete search history.

(56) References Cited

U.S. PATENT DOCUMENTS

| | | | |
|---|---|---|---|
| 3,005,562 | A | 10/1961 | Shaffer |
| 5,794,735 | A | 8/1998 | Sigl |
| 5,938,710 | A | 8/1999 | Lanza et al. |
| 2004/0185986 | A1 | 9/2004 | Takamura et al. |
| 2005/0241873 | A1 | 11/2005 | Hoefler |

FOREIGN PATENT DOCUMENTS

| | | | |
|---|---|---|---|
| DE | 695 13 697 | T2 | 6/2000 |
| EP | 0 908 348 | A2 | 4/1999 |
| GB | 2 373 302 | A | 9/2002 |
| GB | 2379102 | | 2/2003 |
| WO | 98/34127 | | 8/1998 |
| WO | 2004/009396 | | 1/2004 |

OTHER PUBLICATIONS

ISA EPO; International Search Report of EP08020913; Apr. 6, 2009; Den Haag, AN.

*Primary Examiner* — Christopher J. Novosad
(74) *Attorney, Agent, or Firm* — Alleman Hall McCoy Russell & Tuttle LLP

(57) ABSTRACT

The present disclosure relates to a commercial vehicle with a control unit connected with the drive of the commercial vehicle and to a method for controlling a commercial vehicle.

17 Claims, 1 Drawing Sheet

COMMERCIAL VEHICLE WITH CONTROL MEANS AND METHOD FOR CONTROLLING COMMERCIAL VEHICLE

CROSS REFERENCE TO RELATED APPLICATION

This application claims priority to German Patent Application No. 10 2007 059 727.6, filed Dec. 12, 2007, which is hereby incorporated by reference in its entirety for all purposes.

BACKGROUND

The present disclosure relates to a commercial vehicle with a control means connected with the drive of the commercial vehicle and to a method for controlling a commercial vehicle.

For the operational safety of commercial vehicles, in particular construction vehicles such as floor conveyors like lift trucks, reachstackers, wheel loaders, and vehicles with chain drives such as cable excavators or hydraulic excavators, dumpers or mobile cranes, it is necessary that these vehicles can also be brought to a standstill on a greater uphill gradient. For the solution of this technical problem it is known from the prior art to equip such vehicles with an additional service brake. Furthermore, it is known that these vehicles are provided with hydraulic drives. These hydraulic drives generally obtain their energy from conventional combustion engines, in particular diesel units.

In a wheel loader, for instance, the power flow between the working hydraulics and the driving hydraulics is controlled by a so-called "inch pedal". In this way, the driving speed of the commercial vehicle, here the wheel loader, can be controlled independent of the working hydraulics. For instance, if this wheel loader should now be brought to a standstill on a greater uphill gradient, the service brake must be activated in addition. This service brake can be one or more conventional disk and/or drum brakes, which bring the vehicle to a standstill by a frictional/clamping effect. These service brakes must be present, as otherwise a complete standstill could not be achieved due to the hydraulic drives and their internal leakages.

These service brakes necessitate additional technical devices, such as additional actuating elements like additional brake pedals or corresponding switches, whereby the workplace becomes confusing for the operator of the commercial vehicle.

Corresponding service brakes are also known for floor conveyors, for instance for reachstackers. Reachstackers mostly employ a hydraulic converter transmission. Due to the power losses of these additional service brakes as a result of the braking heat, additional cooling circuits must be provided, which increase the weight of the reachstacker and its complexity.

In general, the solutions for standstill brakes for commercial vehicles known from the prior art have the disadvantages that on the one hand they are subject to wear and on the other hand they tend to a higher complexity and hence susceptibility to faults in operation.

Therefore, it is the object of the present disclosure to overcome the disadvantages known from the prior art and in particular provide standstill brakes for commercial vehicles, whose wear is reduced and which in addition provide for a smooth start of the commercial vehicles on any uphill or downhill gradient.

SUMMARY

This object is solved by a commercial vehicle comprising: a drive and control unit connected with the drive of the commercial vehicle, the control unit adapted to detect a driving condition of the commercial vehicle and bring the commercial vehicle to a standstill by adjusting the drive in dependence on the driving condition of the commercial vehicle This provides the advantage that the commercial vehicle can be brought to a standstill by means of the drive hydraulics in one example. The great advantage consists in that the already existing drive system can be used as a standstill brake. Since the commercial vehicle is also movable by means of the drive of the commercial vehicle, the drive can also be used for providing a movement directed opposite to the movement of the commercial vehicle caused by the downhill gradient, so that in sum, the standstill of the commercial vehicle can be realized. Such a solution has the advantage that the wear of the service brakes can distinctly be reduced and, if at all, the same can only be provided for reasons of redundancy. The operational safety of the commercial vehicle thus is distinctly increased.

The drive can be used in the four-quadrant mode. Another advantage consists in that in such drives oil cooling means, such as oil coolers and/or heat exchangers, for the working hydraulics are integrated and it is not necessary to integrate additional elements for cooling the hydraulic medium. Therefore, this braking system is almost free from wear, which distinctly simplifies the maintenance of the commercial vehicle.

Furthermore, the driving force and/or the driving torque can be adjusted or influenced by the control unit. Since forces or torques can be applied onto the drive shafts by means of the drive hydraulics, a driving force opposite to the downgrade force thus can be applied onto the axles of the commercial vehicle, so that the vehicle remains at standstill.

It can be provided that the driving condition can be derived from various physical quantities. It is conceivable, for instance, that by means of a plurality of physical quantities it is redundantly detected whether a downgrade force acts on the commercial vehicle and the commercial vehicle therefore must be brought to a standstill by means of the control means.

Advantageously, the driving condition of the commercial vehicle detectable by means of the detection means is the driving speed and/or the driving direction of the commercial vehicle. Both quantities are particularly easy to detect, whereby a particularly reliable standstill control of the commercial vehicle can be realized.

Furthermore, it is possible that the driving condition of the commercial vehicle can be calculated from the rotational speed, the position and/or the acceleration of the commercial vehicle. These quantities likewise can be used as control quantities due to their good determinability. In particular the rotational speed involves the advantage that this control quantity in principle is available at any time and is detected by components normally present in the commercial vehicle. Since accelerometer systems operating very well are available for measuring the acceleration, this likewise provides for an inexpensive and safe detection of a control quantity for a standstill control of a commercial vehicle.

Furthermore, it is conceivable that the detection means comprise additional sensors, accelerometers and/or distance measuring means, and that the driving condition is detectable by means of the additional sensors, accelerometers and/or distance measuring means.

Furthermore, it can be provided that the additional sensors and/or distance measuring means comprise ultrasonic sensors, radar-assisted sensor systems and/or laser-assisted sensor systems. Such sensor systems have the advantage that the control quantities to be detected with these systems can be detected safely and reliably. Furthermore, these sensor systems have compact dimensions and therefore can be mounted on a commercial vehicle without great effort.

In addition, the driving condition can be detectable by means of observer models, wherein the speed can be estimated from status (e.g., state) variables of the commercial vehicle by means of the observer models. Corresponding observer models can be configured as a control program inside the control unit, which detect a plurality of status variables of the commercial vehicle at the same time, compare the actual values with desired values, and correspondingly adjust the commercial vehicle. The great advantage of this solution consists in that a particularly efficient and effective standstill control can be realized.

Furthermore, the driving condition can be determinable by means of the change in position of the commercial vehicle. If it is known for instance that the commercial vehicle is located in a region with a downhill gradient, it can be concluded from the change in position of the commercial vehicle that the standstill control must be activated.

It is possible that the change in position is determinable by means of an external and/or satellite-based positioning system.

It can be provided that the change in position is determinable by means of GPS and/or Galileo.

Furthermore, it can be provided that the control means includes a multistage control chain. This provides the advantage that the standstill control can be performed with high accuracy and high reliability.

A further embodiment consists in that the drive of the commercial vehicle is hydraulic and/or electric. In general, hydraulic and electric concepts can be employed as drive units. Hydraulic drives include for instance traveling drives in the closed and open hydraulic circuit. Electric drives might for instance be DC drives or drives with a frequency converter. In this connection, it should be noted that the commercial vehicle can have its own hybrid drive, i.e. that a plurality of drive concepts can be combined with each other, for instance a diesel unit as primary drive source, which drives the commercial vehicle in cooperation with a hydraulic and an electric drive.

Advantageously, the quantity representing the driving condition can be the driving torque. This involves the advantage that the load moment necessary for standstill can be calculated by inversion extremely quickly and easily.

In a further aspect, it is conceivable that the control unit can be activated automatically. This provides the advantage that additional control elements can be omitted, which generally contribute to the confusion of the control stand of the commercial vehicle.

In a preferred aspect, the commercial vehicles are floor conveyors, reachstackers, wheel loaders, dumpers or tracked vehicles.

Furthermore, the present disclosure relates to a method for controlling a commercial vehicle with wherein in one operating mode the commercial vehicle is adjusted to standstill by influencing the drive in dependence on the driving condition of the commercial vehicle.

Accordingly, it is provided that in one operating mode the commercial vehicle is adjusted to standstill by influencing the drive in dependence on the driving condition of the commercial vehicle.

By means of the control unit, the driving force and/or the driving torque of the commercial vehicle can be influenced.

It can be provided that the driving condition is determined on the basis of the driving speed and/or the driving direction.

Advantageously, the driving condition is calculated from the rotational speed, the position and/or the acceleration of the commercial vehicle.

Furthermore, it can be provided that the driving condition is detected by means of additional sensors, accelerometers and/or distance measuring means.

The driving condition of the commercial vehicle can be detected by means of ultrasound, radar and/or laser.

Another possibility for designing the method consists in that the driving condition is detected by means of observer models, wherein the current speed is estimated from status variables of the commercial vehicle by means of the observer models.

In accordance with the method, the driving condition also can be determined by means of the change in position of the commercial vehicle. In this connection, it is conceivable that the change in position is determined by means of an external and/or satellite-based positioning system. It is possible that the change in position is determined by means of GPS and/or Galileo.

Advantageously, adjustment is made by means of a multistage control chain. Multistage control methods have the advantage that a higher accuracy can be achieved with the same.

It can be provided that the method is designed such that the commercial vehicle is driven hydraulically and/or electrically.

It is conceivable that the quantity representing the driving condition can be the driving torque.

Advantageously, the control unit is activated automatically or can be activated automatically. This provides the advantage that the vehicle operator need not intervene himself when the commercial vehicle starts skidding on a downhill gradient, which significantly increases safety both for the vehicle operator and for the commercial vehicle.

Preferably, the method of the present disclosure for controlling a commercial vehicle is employed with commercial vehicles such as floor conveyors, reachstackers, wheel loaders, dumpers or tracked vehicles.

In one aspect, it is provided that the operating mode is the standstill of the commercial vehicle on a downhill gradient. Hence it is possible that with an intended standstill of the commercial vehicle on a downhill gradient, the standstill control is effected by means of the control unit in accordance with the present disclosure.

Further details and advantages of the present disclosure will be explained in detail with reference to an embodiment illustrated in the drawing.

DETAILED DESCRIPTION OF THE FIGURE

Figure 1:
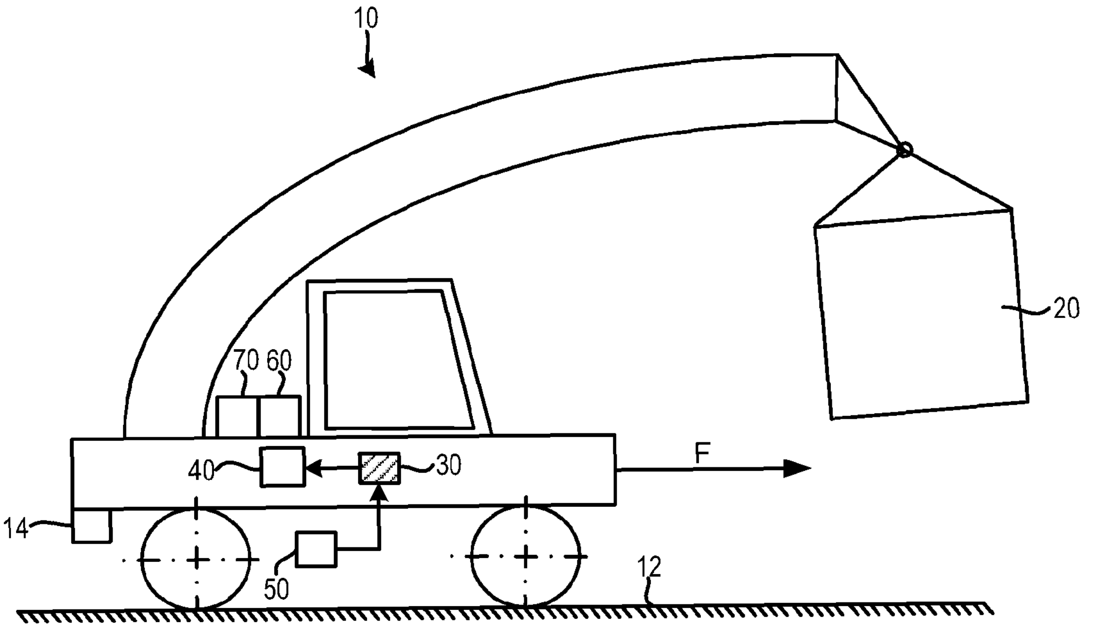
FIG. 1 shows a reachstacker as one example commercial vehicle on a downhill gradient.

FIG. 1 shows the reachstacker 10, which carries a container 20 as a load. A downgrade force F acts on the reachstacker 10, which effects that the reachstacker 10 experiences an acceleration directed downhill.

If the reachstacker 10 should now come to a standstill on a slope 12, the kinetic energy of the vehicle is reduced by means of the existing mechanical service brakes 14. When the reachstacker 10 has almost reached standstill (e.g., vehicle speed has fallen below a threshold speed), the standstill control is activated automatically by the control unit 30. In one example, the standstill control is activated automatically while the mechanical brake is activated. This control hence represents an acting influence between the measured data such as the current rotational speed or the current driving speed and a corresponding exposure of the drive units of the reachstacker 10. In one example, the control unit 30 includes an electronic processor configured to carry out instructions, such as illustrated schematically by the various methods and actions described herein. In one example, the control unit constitutes a control means, however, various other structures may be used, such as various configurations of processing units, etc.

The reachstacker 10 has a hybrid drive concept, illustrated schematically as the example drive unit 40, receiving control signals from control unit 30. The example hybrid drive may include a powerful diesel unit, which among other things supplies the necessary energy for the drive hydraulics of the reachstacker 10. At the same time, non-illustrated electric drives are also provided.

By means of various detection devices 50, such as accelerometers and an independently operating positioning system, here GPS and/or Galileo, both the driving speed and the driving direction of the reachstacker on a downhill gradient are detected and forwarded to the control unit 30. Various other detection means may also be used for detecting movement of the reachstacker 10, such as ultrasonic sensors, radar-assisted sensor systems and/or laser-assisted sensor systems.

As a result, the control unit 30 can adjust the corresponding driving torques on the drive elements of the reachstacker 10 such that the driving speed is reduced to zero. This provides for a standstill of the reachstacker 10 by control, which in one example includes feedback control of the output of the drive unit in response to position, speed, and/or acceleration of the reachstacker 10, thereby compensating automatically for the gradient, if any, upon which the reachstacker is positioned. For example, if the control unit detects motion of the reachstacker in the forward direction (e.g., due to the gravitational force F caused by the slope 12), then the drive unit can generate a reverse drive force equal and opposite to the gravitational forces to thereby hold the position of the reachstacker 10 fixed. In this way, actuation of the mechanical brakes, if equipped, can be reduced If anything unforeseeable now additionally happens on the reachstacker 10, e.g. due to hydraulic leakages, additional disturbing forces resulting from operation, such as operation of the crane, the control already can detect this by means of an observer model (using information from the detection devices to form state parameters, one of which corresponds to unmeasured parameters used by the control unit, such as vehicle speed) on the basis of small movements of the reachstacker and can correspondingly respond thereto with an actuation.

Should the reachstacker roll downhill as a result of the downgrade force F, the driving torque will be increased by the control unit 30, until the speed of the reachstacker again becomes zero. On the other hand, should the reachstacker 10 again move uphill as a result of an overshoot of the control amplitude, the driving torque of the reachstacker 10 will again be reduced correspondingly by the control unit 30.

To improve the oscillation behavior, the control unit 30 therefore is equipped with a multistage control chain. The drive hydraulics 70 (which may be driven by the diesel engine) of the reachstacker 10 chiefly is effected by hydraulically closed circuits. The drive can be employed in the four-quadrant mode. Since an oil cooler or other cooling means 60 for the working hydraulics 70 already are integrated in this embodiment, it is not necessary to integrate additional elements for cooling the hydraulic medium. Therefore, a braking system with more or less wear-free properties is obtained, which simplifies maintenance of the machine.

Figure 2:
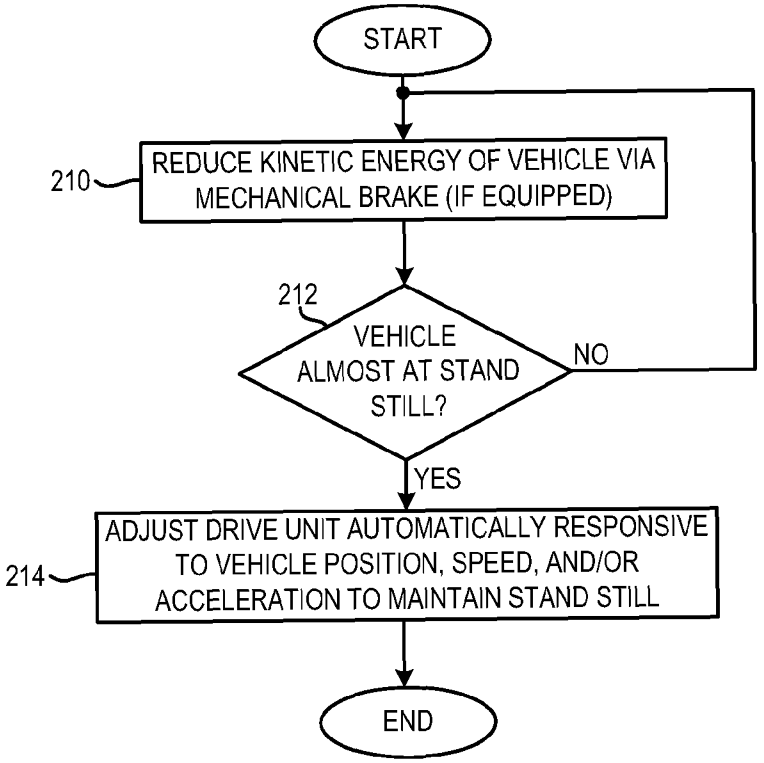
FIG. 2 shows an example method of operation.

Referring now to FIG. 2, it shows at 210 reducing kinetic energy of the commercial vehicle via mechanical brakes (if equipped). Next, at 212, a determination is made whether the vehicle is almost at standstill, such as by detecting a direction of motion and a degree of motion of the vehicle. If so, at 214, which may be referred to as a standstill operating mode, the drive unit of the commercial vehicle is adjusted responsive to the direction and degree of motion (e.g., position, speed, direction, and acceleration, which may include detected grade in one example) to maintain a standstill position. Further, such action and counteract the gravitational forces caused by a ground slope on which the commercial vehicle is positioned, as well as other forces acting to move the vehicle (such as forces caused by working of the vehicle, e.g., extending a crane, adjusting a load on the crane, etc.).

The invention claimed is:

1. A method for controlling a vehicle, comprising:

when the vehicle is on a downhill gradient, adjusting a driving force or torque of a travel drive of the vehicle via a control unit operatively coupled to the travel drive and to a detector of the vehicle, in dependence on a driving condition of the vehicle to oppose a downgrade force on the vehicle to keep the vehicle at a standstill.

2. The method of claim 1, wherein the vehicle is a load-lifting vehicle and is kept at a standstill in response to disturbances acting on the vehicle.

3. The method of claim 2, wherein the driving condition includes a driving speed.

4. The method of claim 2, wherein the vehicle is driven by a hydraulic drive unit coupled to an engine of the vehicle.

5. The method of claim 2, wherein said adjusting is activated automatically.

6. The method of claim 2, wherein the driving condition includes a driving direction.

7. The method of claim 1, wherein the driving condition is calculated from a rotational speed, position, or acceleration of the vehicle.

8. The method of claim 1, wherein the driving condition is detected via the detector, where the detector comprises an accelerometer or distance-measuring device.

9. The method of claim 1, wherein the detector detects the driving condition via ultrasound, radar, or laser.

10. The method of claim 1, wherein the detector detects the driving condition according to an observer model, which estimates a speed of the vehicle from state variables of the vehicle.

11. The method of claim 1, wherein the driving condition includes a change in position of the vehicle.

12. The method of claim 11, wherein the change in position is determined via an external or satellite-based positioning system.

13. The method of claim 11, wherein the change in position is determined via a global positioning system.

14. The method of claim 1, wherein said adjusting is enacted using a multistage feedback control chain of the control unit.

15. The method of claim 1, wherein the driving condition includes the driving torque of the travel drive of the vehicle.

16. The method of claim 1, wherein the vehicle is at least one of a floor conveyor, reach stacker, wheel loader, dumper, or tracked vehicle.

17. The method of claim 1, further comprising detecting the driving condition.

* * * * *